Patented Oct. 10, 1939

2,175,782

UNITED STATES PATENT OFFICE 2,175,782

ANESTHETIC

Gerald F. Rorer, Wyncote, Pa., assignor to William H. Rorer, Inc., Philadelphia, Pa., a corporation of Pennsylvania No Drawing. Application May 6, 1936,
Serial No. 78,289

9 Claims. (Cl. 167—52)

My invention relates to a novel anesthetic, and more particularly it relates to a product capable of producing profound local anesthesia of relatively long duration. This application is a continuation in part of my copending application Serial Number 52,277, filed November 29, 1935.

The principal object of the present invention is to provide a novel anesthetic which is characterized by many advantageous properties, including its non-toxic nature as anesthetically applied and its ability to produce a local anesthesia of a more profound nature and of longer duration than has heretofore been possible with anesthetics of the type contemplated herein.

A further object of the invention is to furnish an anesthetic which may be employed as a substitute for cocaine and its salts owing to its ability to produce substantially the same results as cocaine hydrochloride, the most commonly employed cocaine derivative, with the elimination, however, of the deleterious tendencies of toxicity and habit formation characteristic of cocaine-containing products.

Still another object of the present invention is to provide a compound which is readily soluble in water, alcohol, chloroform and ether, and is soluble to an appreciable extent in vegetable oils, and may be administered by injection, dropping in the eye, or topical application, or may be applied in the form of an ointment, suppository or water-soluble jelly.

Other objects will be apparent from a consideration of the specification and claims.

As is well known, cocaine and its salts, typified by cocaine hydrochloride, have been widely employed as a local anesthetic due to their potency. These compounds, however, are toxic and habit-forming, and their use has been replaced to a considerable extent, where possible, by a product known as procaine hydrochloride which, although less toxic and non-habit forming lacks the potency of cocaine derivatives, and will not penetrate and anesthetize mucous membranes on surface application.

The product of the present invention exhibits markedly increased anesthetic power and other advantageous properties as compared to known procaine products, and may be employed successfully as a substitute for cocaine hydrochloride in the various uses where that compound is applicable. The anesthetic of the invention has proved to be distinctly more powerful than procaine hydrochloride, approaching cocaine hydrochloride in profoundness and duration of anesthesia, as has been demonstrated in clinical work on man and by recognized biologic tests carried out on the excised sciatic nerve of the frog. In addition, it causes anesthesia more rapidly than procaine hydrochloride and the anesthesia created is longer in duration. The compound is also less toxic than procaine hydrochloride. The product is soluble up to 5% in vegetable oils, chloroform and ether, and is alkaline in freshly prepared solutions, properties not encountered with procaine hydrochloride. The product finds uses for which procaine hydrochloride is worthless, for example, it may be successfully employed topically and in anesthetizing the eye by merely dropping a dilute solution of the product therein. In addition to these properties, the product possesses all the desirable qualities of procaine hydrochloride, for example, it is non-habit forming and is completely soluble in water and alcohols.

The present invention contemplates the novel anesthetic which chemically may be designated as a para-amino-benzoyl-diethylaminoethanol butyrate. The compound may be the salt either of isobutyric acid or of normal butyric acid, in most instances the former being preferred. The chemical formula for the isobutyrate may be represented as follows:

$NH_2.C_6H_4.COO.C_2H_4.N(C_2H_5)_2.(CH_3)_2CHCOOH$

Obviously, the normal butyrate may be designated by a similar formula where $CH_3CH_2CH_2COOH$ is substituted therein for $(CH_3)_2CHCOOH$. The product may also be known as a procaine butyrate since the para-aminobenzoyl-diethylaminoethanol is known as procaine base. Hereinafter, for convenience, in the specification and claims, the terms "a procaine butyrate", "procaine isobutyrate" and "procaine n-butyrate" will be employed to designate the anesthetic of the invention.

The product may advantageously be prepared by reacting the procaine base with a butyric acid in suitable proportions, preferably in molecular proportions. If desired, however, an excess of one of the ingredients may be present in the final product, but in general, the final product will not contain an excess of either reactant, or will contain an excess of procaine base. The amount of procaine base in excess of that required to neutralize the butyric acid may be as much as 10% or 20% of the total weight of the product, or even higher, due to the fact that base is soluble to some extent in an aqueous solution of the salt, or in the salt itself in liquid form. The procaine base should not be present in sufficient excess to precipitate or separate when an aqueous solution of the anesthetic is prepared.

A reaction between the procaine base and the butyric acid will take place at room temperature when the compounds are mixed together. The reaction is facilitated by gentle heating; for example, the product may be advantageously prepared by heating the acid to 50° to 60° C. and thereafter adding the procaine base thereto, or by mixing and stirring the ingredients together at room temperature and then heating the mixture to 50° C. to 60° C. Higher temperatures may be employed, if desired.

The procaine iso-butyrate is a white crystalline powder, stable in the air, with an ester-like aromatic odor. It is freely soluble in water, alcohols, chloroform, and ether and soluble up to 5% in vegetable oils. It has a melting point of 57.5° C. and the aqueous solutions are partially decomposed when heated to 100° C. for about one hour.

The procaine n-butyrate is usually obtained as a very viscous, tacky, clear liquid with a slightly yellowish color and a mild butyric odor. The product may be crystallized with difficulty into flat, colorless, transparent rectangular plates. When dissolved in water, it is characterized by an aromatic odor which is not unpleasant. The product has the same solubility characteristics as the isobutyrate.

The specific gravity of both products is slightly greater than 1 and they may be identified as follows:

(a) An aqueous solution (1:15) of a procaine butyrate yields a white precipitate with mercuric potassium iodide solution (Mayer's reagent).

(b) An aqueous solution (1:15) of a procaine butyrate yields a white precipitate with ammonium hydroxide, which precipitate is soluble in chloroform.

Procaine n-butyrate in aqueous solution (1:15) yields a white precipitate upon the addition of a solution of tenth normal silver nitrate, while procaine isobutyrate does not precipitate under these conditions.

The procaine butyrate is applicable for all uses where local anesthesia is desired, and is preferably associated in amounts generally from ½% to 55% with a suitable carrying medium. It may be administered in the form of a solution in various solvents such as water, an alcohol, a vegetable oil and the like, concentration thereof being determined by the use for which the preparation is intended. It may also be associated in an ointment or suppository with suitable base materials to furnish body in the same manner as other preparations of this type are compounded. Suitable drugs, antiseptics and essential oils may be associated with the anesthetic in the various preparations, for example, epinephrin hydrochloride, or ephedrine may be employed to retard the rate of absorption of the anesthetic, and cresol, phenol, thyme, or menthol may be employed as an antiseptic.

When the anesthetic is to be administered by injection, an aqueous solution usually varying from ½% to 2%, although these limits are not critical, will be employed depending on the area and amount of anesthesia desired. Since the anesthetic has been found to be distinctly more powerful than procaine hydrochloride and to produce a more profound anesthesia more rapidly than that compound, a solution considerably less than the strength of the usual procaine hydrochloride solution gives excellent results. An aqueous solution containing 1% procaine butyrate, 1:25,000 epinephrin hydrochloride and .5% chlorbutanol has been successfully used in the dental clinic of a large hospital, in place of a comparable solution containing 2% procaine hydrochloride.

In producing eye anesthesia, a few drops of an aqueous solution, containing generally from ½% to 2% procaine butyrate, either with or without epinephrin hydrochloride, may be administered to the surface of the eye by means of a volumetric pipette. Anesthesia will occur in from three to five minutes. As previously pointed out, procaine hydrochloride is of no value in anesthetizing the eye.

A suitable preparation for topical application may have the following composition:

| | Per cent |
|---|---|
| Procaine isobutyrate | 50 |
| Menthol | 5 |
| Oil spearmint | 2.5 |
| Oil thyme | .25 |
| Ephedrine | 1 |
| Benzyl alcohol | 41 |
| Liquid phenol | .25 |

The solution may be applied to a clean mucous membrane surface by means of a swab or some suitable instrument and for dental work, the surface to be anesthetized may advantageously be dried prior to the application of the preparation. Large amounts are not necessary and it is not necessary to apply pressure or to rub beyond one or two strokes. Anesthesia of the surface will be produced in one to two minutes time. While in the specific example, fifty per cent of procaine isobutyrate is included, it is to be understood that the percentage may be varied, for example, from 5% to 55%. As a topical anesthetic also, procaine butyrate approaches the potency of cocaine hydrochloride and is to be contrasted with procaine hydrochloride which does not possess this property.

The ointments and suppositories may contain any desired amount of the procaine butyrate, for example, from 5% to 20%, mixed with a suitable base material, usually of an oleaginous nature, and both are advantageous for use in the treatment of hemorrhoids and fissures. As an example of an ointment, the following is given:

| | | |
|---|---|---|
| Procaine isobutyrate | 10% | |
| Ephedrine | .5% | |
| Cresol | .1% | |
| Oil spearmint | | |
| White oil | | In proportionate combinations |
| White wax | | |
| White petrolatum | | |
| Lard U. S. P | | |

The following is illustrative of the formulae for a suppository:

| | Per cent |
|---|---|
| Procaine butyrate | 10 |
| Ephedrin | .5 |
| Cresol | .1 |
| Oil thyme | .1 |
| Spermaceti | 15 |
| White wax | 5 |
| Cacao butter | q. s. |

When the ointment or suppository is applied, a complete cessation of pain is noted within five minutes after insertion, and this relief is profound and of long duration. Again the action of the anesthetic of the present invention is to be contrasted with the lack of satisfactory action of procaine hydrochloride for this purpose.

Other uses of the anesthetic will occur to those familiar with local anesthesia; for example, the use of 4% procaine butyrate dissolved in lubricating jelly for the passage of instruments into the urethra, or the use in the form of a troche for the relief of pain in the throat may be mentioned. Considerable modification in the methods of preparing the butyrate, in the methods of using the same and in the proportions of procaine butyrate employed are also possible without departing from the essential features of the invention.

I claim:

1. An anesthetic comprising a procaine butyrate.
2. An anesthetic comprising a procaine butyrate, the procaine butyrate being substantially free from procaine base and butyric acid.
3. An anesthetic comprising procaine n-butyrate.
4. An anesthetic comprising a solution of ½% to 55% of a procaine butyrate.
5. An anesthetic comprising an aqueous solution of ⅕% to 2% of a procaine butyrate.
6. An anesthetic comprising an alcohol solution containing in the neighborhood of 50% of a procaine butyrate.
7. An anesthetic ointment or suppository, comprising an oleaginous base material and 5% to 20% of a procaine butyrate.
8. A procaine butyrate.
9. Procaine n-butyrate.

GERALD F. RORER.